(12) United States Patent
Ahmed

(10) Patent No.: US 8,116,580 B2
(45) Date of Patent: Feb. 14, 2012

(54) EMBEDDED HIGH FREQUENCY IMAGE DETAILS

(75) Inventor: Mohamed Nooman Ahmed, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 947 days.

(21) Appl. No.: 12/119,229

(22) Filed: May 12, 2008

(65) Prior Publication Data

US 2009/0279804 A1    Nov. 12, 2009

(51) Int. Cl.
*G06K 9/36* (2006.01)
(52) U.S. Cl. ............................ 382/240; 382/233
(58) Field of Classification Search .............. 382/232, 382/233, 234, 240, 244, 248
See application file for complete search history.

(56) References Cited

U.S. PATENT DOCUMENTS

| | | | |
|---|---|---|---|
| 5,875,041 A | 2/1999 | Nakatani et al. | |
| 5,907,362 A | 5/1999 | Yamamoto | |
| 5,959,675 A | 9/1999 | Mita et al. | |
| 6,014,467 A | 1/2000 | Asano | |
| 6,075,619 A | 6/2000 | Iizuka | |
| 6,314,208 B1 | 11/2001 | Konstantinides et al. | |
| 7,088,866 B2 * | 8/2006 | Andrew | 382/233 |
| 2002/0057844 A1 * | 5/2002 | Sirohey et al. | 382/240 |
| 2005/0053301 A1 * | 3/2005 | Chui et al. | 382/239 |

* cited by examiner

*Primary Examiner* — Phuoc Tran

(57) ABSTRACT

A system, method, and process for embedding low frequency image details and high frequency image details into a final digital image file. A digital image file is stored with embedded low and high frequency image details that are accessible with a compatible digital image decoder and a non-compatible digital image decoder. Non-compatible digital image decoders access only a compressed low frequency image of the original digital image contained in the final digital image file. Compatible digital image decoders use the embedded high frequency image details contained in the final digital image file to render a high resolution image.

20 Claims, 9 Drawing Sheets

EMBEDDED HIGH FREQUENCY IMAGE DETAILS

TECHNICAL FIELD

The present invention relates to a method, process, and system for embedding high frequency image details into a digital image file.

BACKGROUND

There are a multitude of devices and techniques for creating digital representations of images. For example, digital images of physical objects can be created using digital imaging devices such as digital cameras, scanners, and radars while computer graphics and imaging programs directly generate digital images. Regardless of source, a digital image is commonly arranged as a 2-dimensional (2D) array of pixels. Each pixel of an image has a specific position and a value. For example, the value of a red-green-blue (RGB) color digital image pixel is commonly represented by a triplet of values, one for each of the red, green or blue color channels. The raw pixel data generated by digital imaging devices and computer graphics is typically converted and stored as a digital image file.

There are many different types of digital image file formats. Some common examples of digital image file formats include windows bitmap (bmp), graphics interchange format (gif), exchangeable image file (exif), RAW image format (RAW), and portable network graphics (png). Another commonly used file format is the Tagged Image File Format (TIFF). Two of the most commonly used formats are the Joint Photographic Experts Group (JPEG) and a new wavelet-based compression technique referred as JPEG2000. Many of these digital image file formats include some method of either lossy or lossless compression of the images to reduce the amount of memory necessary to store the image and the bandwidth consumed during transmission of the image.

Some of the challenges in storing and transmitting digital image files is balancing the desire for reduced image file size against the need for higher resolution and 1197899 thus, additional information. Lossless compression techniques can only reduce the overall file by a finite amount. Therefore, many digital image file formats compress images using a lossy compression technique by reducing and eliminating the rapidly changing or high frequency components of the image. The elimination of these rapidly changing elements may result in blurring of images and other negative effects, particularly high frequency information as might be generated by text or other line art present in the digital image.

A second challenge in storing and transmitting digital image files may be the presence of incompatible digital image file formats. Typically a digital image is first encoded to a digital image file using an encoder. After the digital image file is generated it must be decoded by a decoder prior to being rendered for either viewing or printing. Incompatibilities between digital file formats and decoders may render digital image files unreadable on many computers and reduce the prevalence and portability of different types of digital images files.

Therefore, there is a need for a method, process, and system for embedding high frequency image images into an image file that remains compatible with existing image rendering systems while providing additional image resolution when rendered with a compliant viewer.

BRIEF DESCRIPTION OF THE DRAWINGS

The accompanying figures depict multiple embodiments of a system, process, and method for embedded high frequency image details. A brief description of each figure is provided below. Elements with the same reference numbers in each figure indicate identical or functionally similar elements. Additionally, the left-most digit(s) of a reference number identifies the drawings in which the reference number first appears.

DETAILED DESCRIPTION

Figure 1:
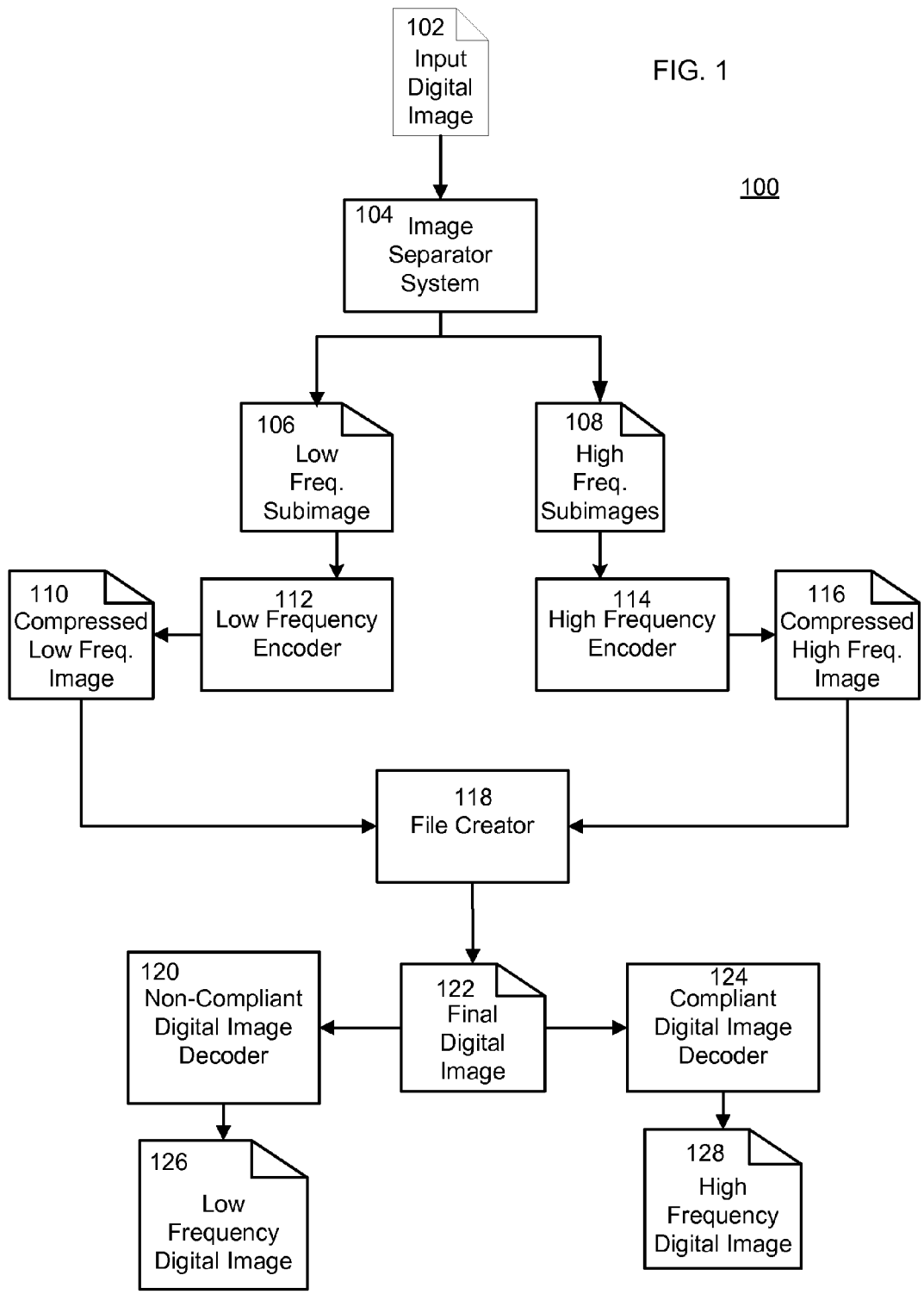
FIG. 1 is a block diagram detailing an imaging system.

FIG. 1 is a block diagram detailing an imaging system 100. The imaging system 100 comprises an image separator system 104, low frequency encoder 112, high frequency encoder 114, and a file creator 118, wherein the imaging system 100 receives an input digital image 102 and generates a final digital image 122 which embeds both low and high frequency data. The imaging system 100 also comprises both a non-compliant digital image decoder 120 and a compliant digital image decoder 124. The non-compliant decoder is typically a decoder or viewer for images in proprietary file formats and is usually created by the supplier of such format. A compliant decoder is a generally known and available image viewer or decoder for commonly recognized image file formats, such as JPEG, JPEG2000, TIFF, GIF, PNG, Exif and bmp.

The non-compliant digital image decoder 120 receives the final digital image 122 and decodes only the low frequency data, resulting in a low frequency digital image 126. For example, any conventional imaging software program can read in the final digital image 122 and process the low frequency data. In contrast, the compliant digital image decoder 124 receives the final digital image 122 and decodes both the low and high frequency data, resulting in a high frequency, or high-resolution, digital image 128. Once generated, the low frequency digital image 126 and the high frequency digital image 128 are available for display, editing, storing, or printing.

Figure 2:
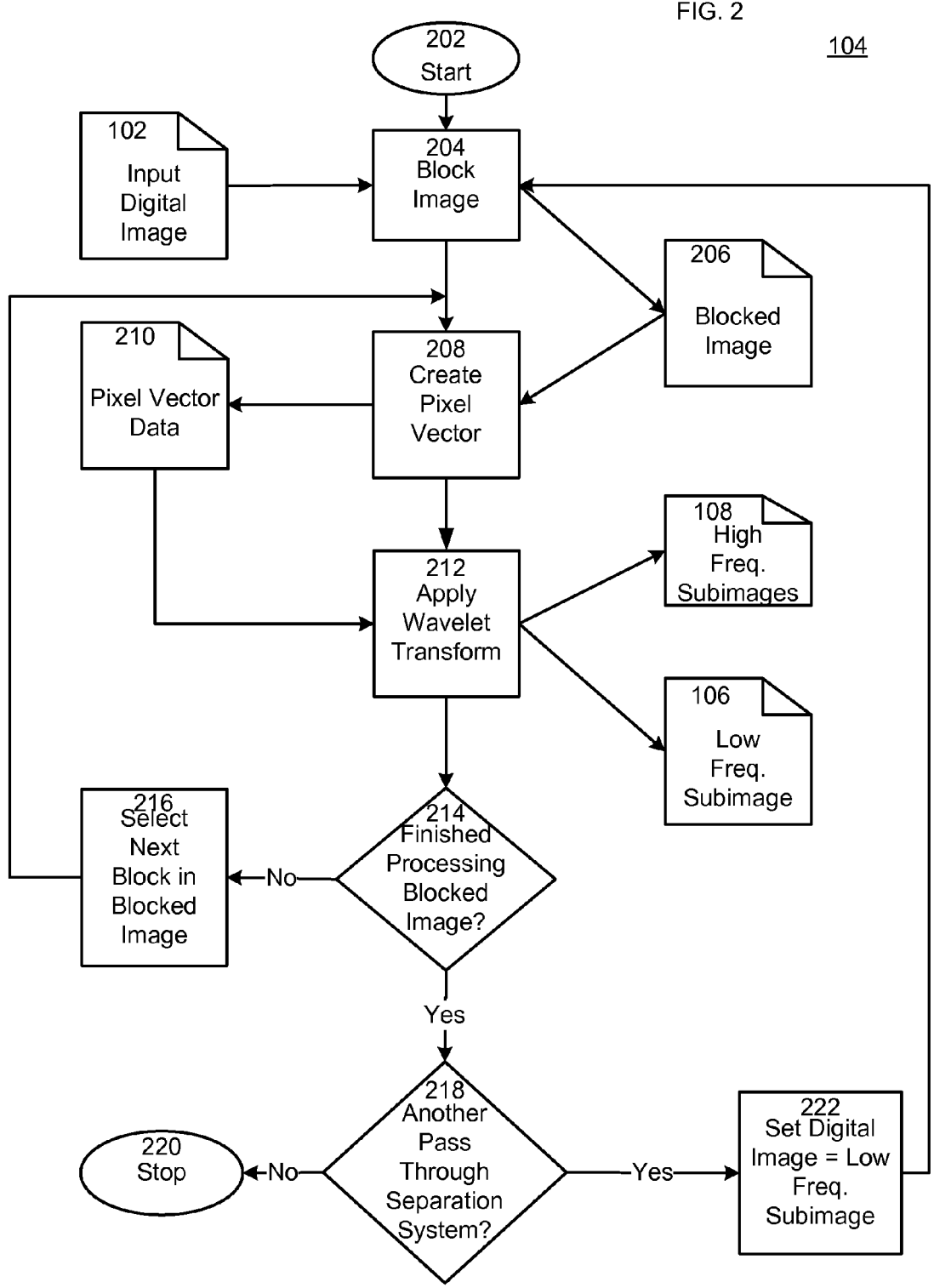
FIG. 2 is a flow chart detailing an operation of image separator system.

The operation of the image separator system 104 is shown in FIG. 2. Processing starts 202 and proceeds a the block image operation 204. In the block image operation 204, the image separator system 104 receives the input digital image 102 and blocks the image 102 into non-overlapping pixel blocks, thereby creating a blocked image 206. Preferably, the input digital image 102 is blocked into non-overlapping 2×2 pixel blocks which contains a total of four pixels. In alternative embodiments, the input digital image 102 is blocked into square or rectangular pixel blocks having a different number of pixels, such as 1×2, 3×3, 4×4 or 8×8. Thus, the resulting pixel blocks of the blocked image 206 may be either of a uniform or a non-uniform size. Also, the block image operation 204 of the input digital image 102 may occur sequentially or as a batch process.

Once the blocked image 206 is created, the image separator system 104 proceeds to a create pixel vector operation 208, which orients each pixel block of the blocked image 206 as a pixel vector. For example, the image separator system 104 retrieves a current pixel block from the blocked image 206, orients the current pixel block as a vector as shown in Expression 1, and stores the vector as pixel vector data 210.

$$\begin{bmatrix} x_1 & x_2 \\ x_3 & x_4 \end{bmatrix} \Rightarrow \begin{bmatrix} x_1 \\ x_2 \\ x_3 \\ x_4 \end{bmatrix}$$ [Expression 1]

The image separator system 104 performs an apply wavelet transform operation 212. The apply wavelet transform operation 212 applies a wavelet transform function to the pixel vector data 210, as shown in Expression 2, to generate a low frequency subimage 106 and a high frequency subimage 108.

$$\begin{bmatrix} a \\ b \\ c \\ d \end{bmatrix} = \frac{1}{4} \begin{bmatrix} 1 & 1 & 1 & 1 \\ 1 & 1 & -1 & -1 \\ 1 & -1 & 1 & -1 \\ 1 & -1 & -1 & 1 \end{bmatrix} \begin{bmatrix} x1 \\ x2 \\ x3 \\ x4 \end{bmatrix}$$ [Expression 2]

Expression 2 provides the preferred Haar wavelet transform; however, other wavelet transforms may be used. The preferred wavelet transform parameters [a, b, c, d] of Expression 2 represent different components of information from the pixel vector data 210. The wavelet parameter a represents the average value of the pixel vector data 210, and as such, is considered a low frequency representation of the corresponding pixel vector and is used to generate the low frequency subimage 106. The wavelet parameters b, c, and d represent edge information or higher frequency data regarding the pixel vector data 210 and are used to generate the high frequency subimage 108. Alternative embodiments may utilize other types of wavelet transforms, including, but not limited to, Daubechies, Cohen-Daubechies-Feauveau, and symlet wavelet transforms.

In an alternative embodiment, the wavelet parameter a is used to create the low frequency subimage 106. The low frequency subimage 106 is an accumulation of all of the a parameters from the successive application of the wavelet transform operation 212 to the non-overlapping pixel blocks of the blocked image 206. In addition to the low frequency subimage 106, a similar set of three high frequency subimages 108 are created by accumulating all of the b, c, and d parameters from successive application of the wavelet transform operation 212 to the non-overlapping pixel blocks of the blocked image 206. After the respective wavelet transform parameters are accumulated for a specific pixel block of the blocked image 206, the image separator system 104 determines 214 if the entire blocked image 206 has been transformed into high frequency subimages 108 and low frequency subimage 106. If the blocked image 206 has not been completely transformed, then the image separator system 104 selects the next non-overlapping pixel block 216, and the process repeats. In this embodiment, a 2×2 pixel block is extracted from the blocked image 206 with each iteration of the image separator system 104. When the processing is finished of all pixel blocks of the blocked image 206, the wavelet transform operation 212 has been applied to the entire blocked image 206, and the resulting wavelet parameters have been separated into respective low frequency subimage 106 and high frequency subimages 108 creating a first pass composite image output.

Figure 8:
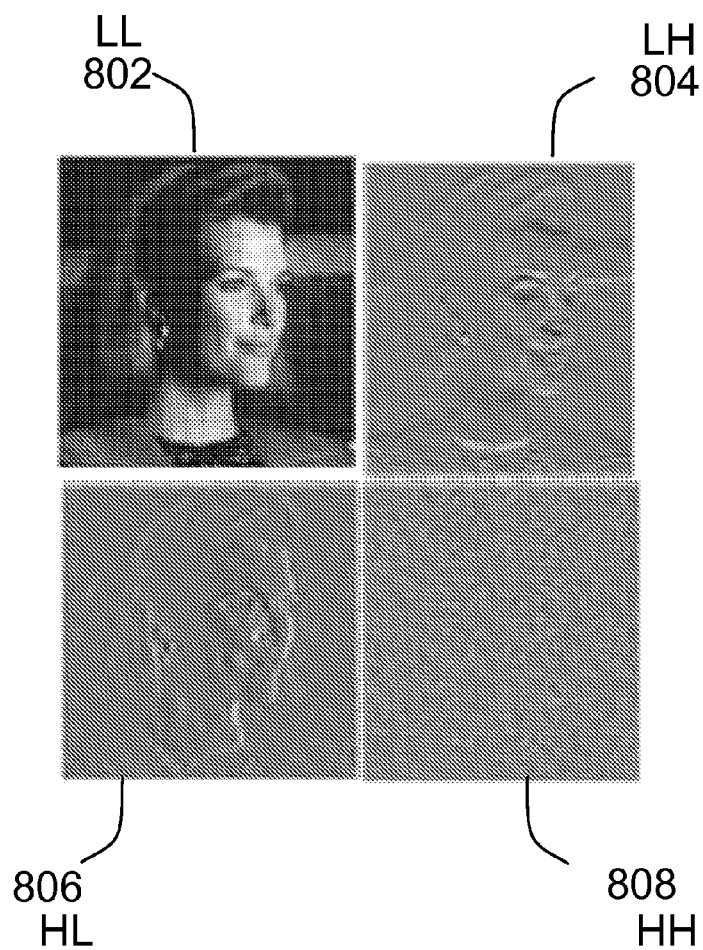
FIG. 8 is an example of low frequency and high frequency subimages created by the image separator system of FIG. 2.

FIG. 8 shows the first pass composite image 800 output after one pass through the image separator system 104. The resulting low-level (LL) frequency subimage 802, which represents the wavelet transform parameter a, is an average of the 2×2 pixel blocks of the blocked image 206. Therefore, the LL frequency subimage 802 is ¼ the original size of the entire input digital image 102. The first pass composite image 800 also contains three high frequency subimages: the Low-High (LH) level subimage 804; the High-Low (HL) level subimage 806; and, the High-High (HH) level subimage 808. These high frequency subimages, 804, 806, and 808, and in particular the HH subimage 808 are nearly all zeros, while the LL subimage 802 is still recognizable as the original image albeit with reduced resolution.

Referring back to FIG. 2, after the first pass processing of the input digital image 102 and creating a composite image 800, the image separator system 104 determines in operation 218 whether another pass through the image separator system 104 is needed (described in detail below). If another pass is required, the image separator system 104 proceeds to operation 222 and sets the input digital image 102 equal to the low frequency subimage 106, for example, as shown as LL frequency subimage 802 in FIG. 8. Since the next pass through the image separator system 104 is only applied to the low frequency subimage 106, the high frequency subimages 108, for example, LH level subimage 804, HL level subimage 806, and HH level subimage 808 of FIG. 8, are passed directly through to the high frequency encoder 114.

Figure 9:
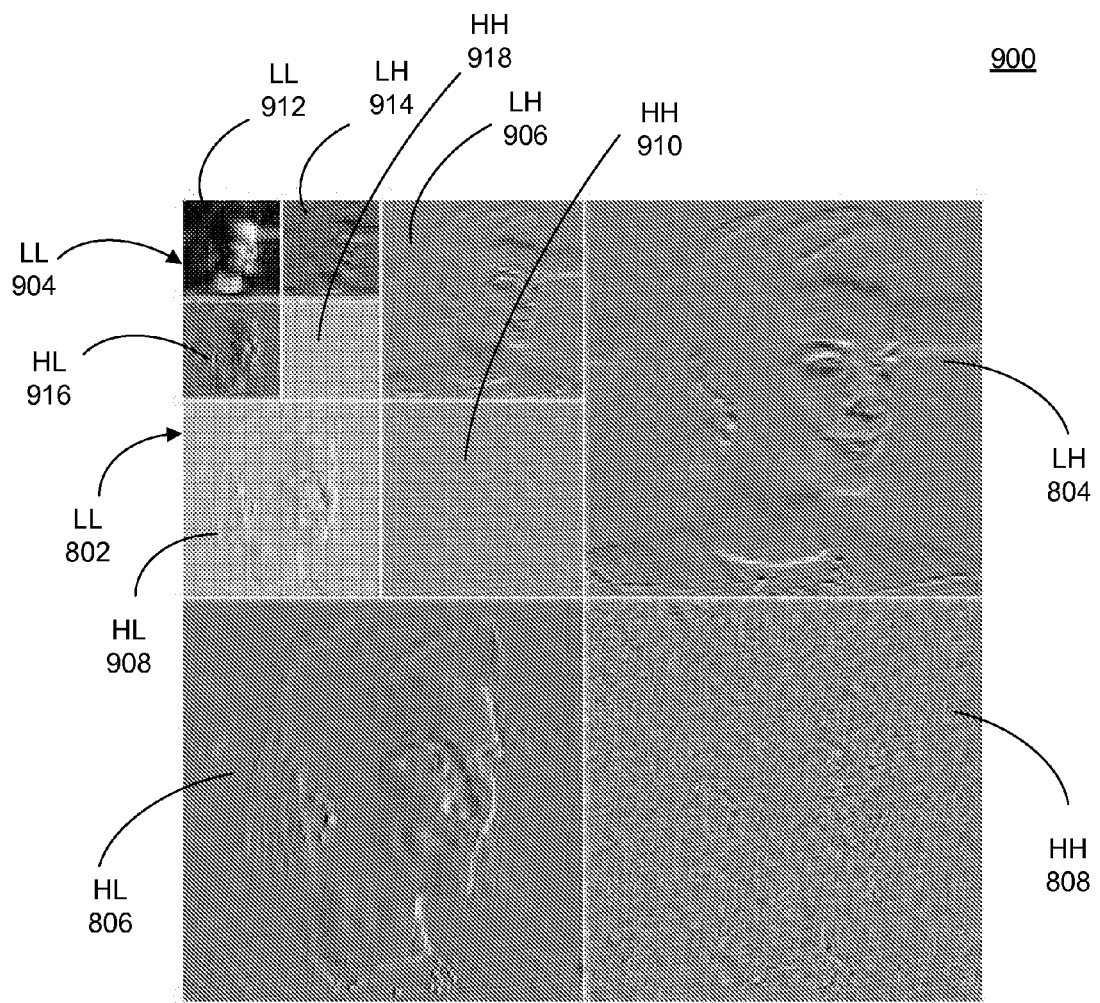
FIG. 9 is an example of low frequency and high frequency subimages created by three passes of the image separator system of FIG. 2.

FIG. 9 illustrates multiple passes of an input digital image 102 (shown as composite image 900) through the image separator system 104, and in particular shows low frequency subimages 106 and high frequency subimages 108 created by three passes through the image separator system 104. A second pass through the image separator system 104 inputs the first LL frequency subimage 802 as the input digital image 102. The output of a second pass through the image separator system 104 is a second LL frequency subimage 904, a second LH level subimage 906, a second HL level subimage 908, and a second HH level subimage 910.

A third pass through the image separator system 104 inputs the second LL frequency subimage 904 as the input digital image 102. The output of a third pass through the image separator system 104 is a third LL frequency subimage 912 and the following third pass high frequency subimages 108: third pass LH subimage 914, third pass HL subimage 916, and third pass HH subimage 918.

The three pass composite image 900 demonstrates the ability to successively apply the image separator system 104 to the low level frequency subimage 106 of a given blocked image 206. Each successive pass through the image separator system 104 reduces the overall size of the low frequency subimage 106 and the resulting resolution and size of the original, base input digital image 102. In the preferred embodiment, the number of passes through the image separator system 104 is selectable by the user based on the desired reduction of original image resolution and other parameters such as a user tunable low frequency image resolution selection threshold or a scaling parameter. After separation of the low frequency subimage 106 from the high frequency subimages 108 from the first, second and third passes through the image separator system 104, the low frequency image 106

(e.g., third LL frequency subimage 912) is output to the low frequency encoder 112 while the high frequency images 108 are output to a high frequency encoder 114.

Multiple passes may be made through the image separator system 104 until operation 218 determines that no additional passes on the low frequency subimage 106 are desired. If no such additional processing is desired, the image separator system 104 has completed its processing 220 of the input digital image 102.

Figure 3:
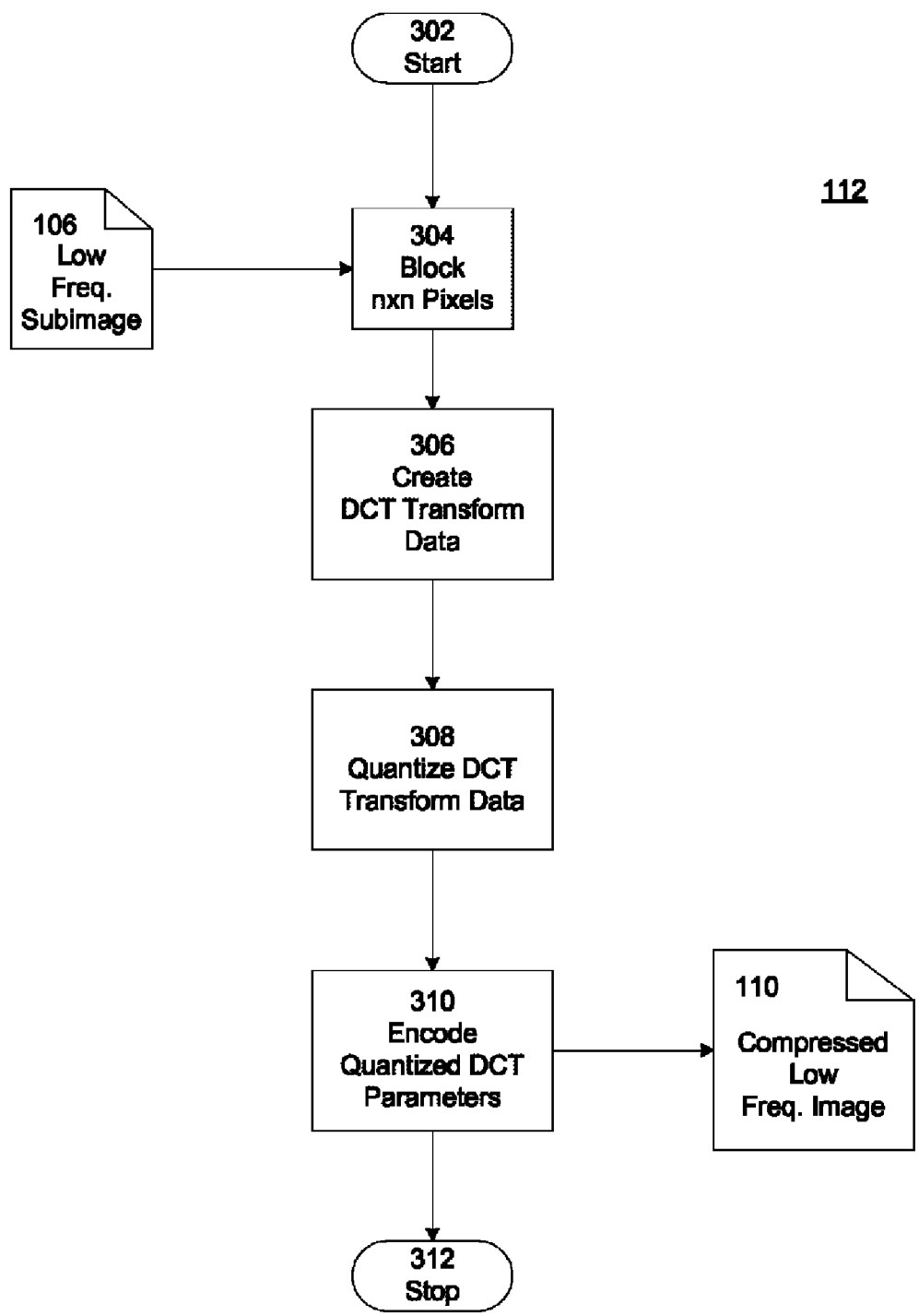
FIG. 3 is a flow chart detailing an operation of a low frequency encoder.

The low frequency encoder 112 processes only the output of the low frequency subimage 106 and is shown on FIG. 3. The low frequency encoder 112 uses a standard or established image encoding technique in order to ensure compatibility with the greatest number of image rendering systems. A number of different types of image encoding techniques are used in different embodiments. In the preferred embodiment, the image encoding technique used is the JPEG process, as it is a well-known process and easy to implement.

After starting 302, the low frequency encoder 112 inputs the low frequency subimage 106 and blocks it into n×n pixel blocks in operation 304. In this embodiment, the standard JPEG process is applied to an 8×8 pixel non-overlapping block. The resulting pixel blocks are then processed in operation 306 using a discrete cosine transform (DCT), as shown in Expression 3. The preferred DCT is related to a discrete Fourier transform (DFT), but using only real numbers that provide a representation of the 8×8 pixel block. This preferred DCT concentrates most of the signal information in a 8×8 pixel block in a few low frequency components in order to compact the signal. This successive application of the DCT transform to the pixel blocks creates the DCT transform data of operation 306.

$$f_j = \sum_{k=0}^{n-1} x_k \cos\left[\frac{\pi}{n} j\left(k + \frac{1}{2}\right)\right]$$ [Expression 3]

After creating the DCT Transform data, the low frequency encoder 112 proceeds to operation 308 and quantizes the DCT transform data by dividing each coefficient of the DCT transform data by a predefined number. The quantization effectively reduces the values of higher frequency information produced by the DCT transform operation 306. A common quantization matrix for a JPEG image process is shown in Expression 4, below. After the DCT transform data has been divided by the quantization matrix, a threshold or rounding process is applied to the resulting coefficients to eliminate values near zero and fractional values. The result is a plurality of quantized DCT parameters. The larger the quantization values are, the greater the degree of compression of the signal, and typically the greater the loss of high frequency subimage details.

$$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$ [Expression 4]

The quantized DCT parameters created in operation 308 are next encoded in operation 310 using an entropy encoding technique. Entropy encoding compresses data by replacing symbols represented by equal-length codes with symbols represented by codes proportional to the negative logarithm of the probability. Thus, the most common symbols use the shortest codes. For the JPEG process, a common entropy encoding process is Huffman coding. The Huffman coding process allows for lossless data compression of the quantized DCT parameters resulting in encoded DCT parameters.

After the quantized DCT parameters are created, the low frequency encoder 112 creates the compressed low frequency image 110. The compressed low frequency image 110 is created by outputting the encoded DCT parameters and associated information into a standard image file format associated with the compression standard used. In this embodiment, the JPEG file format is used. Once the compressed low frequency image 110 is created, the low level encoder 112 has completed its operation 312.

Figure 4:
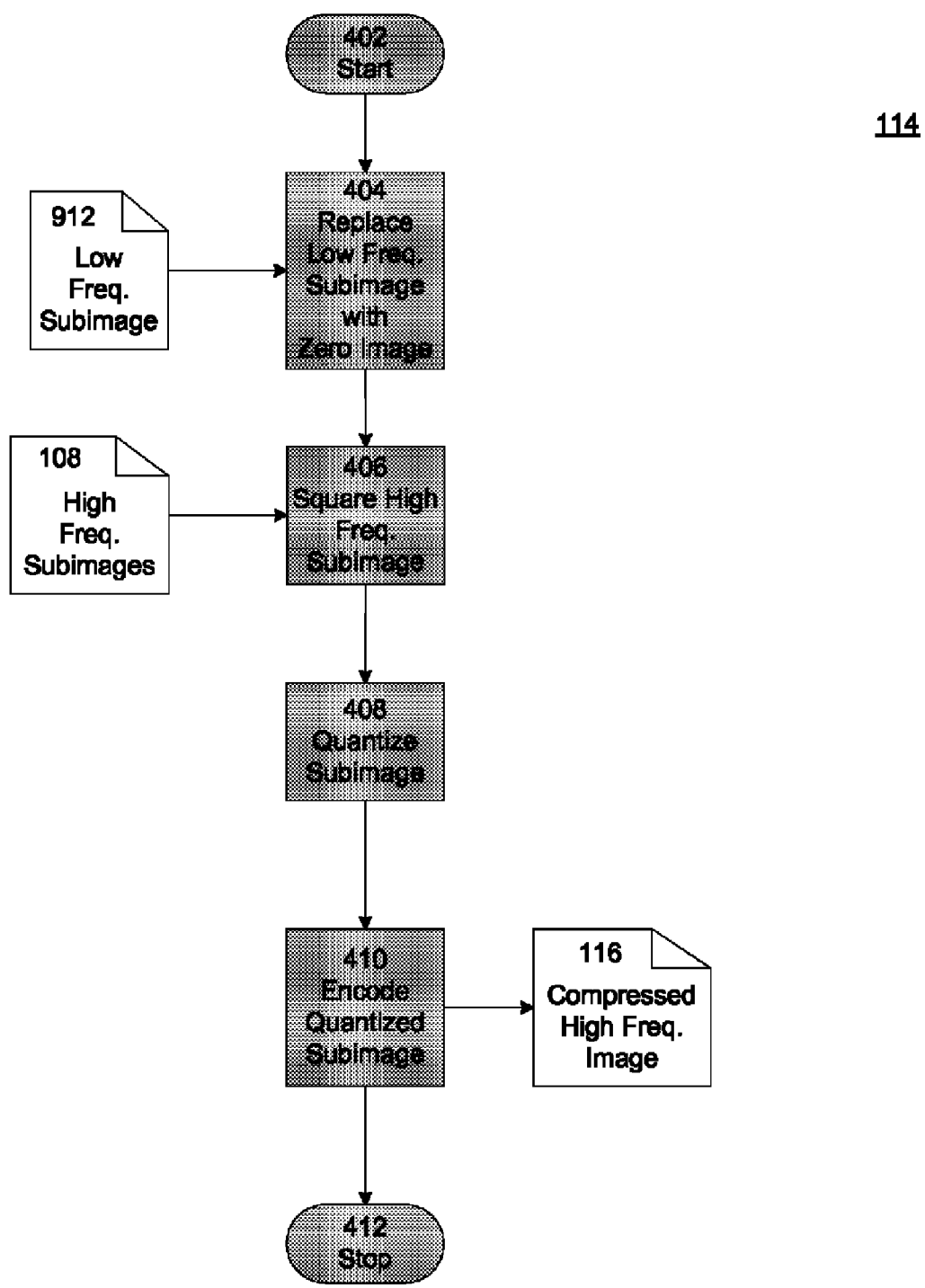
FIG. 4 is a flow chart detailing an operation of a high frequency encoder.

The high frequency encoder 114, shown in FIG. 4, compresses the high frequency subimages 108 which will subsequently be embedded with the compressed low frequency image 110. Processing starts 402 and immediately proceeds to operation 404 wherein the high frequency encoder 114 replaces the LL frequency subimage 912 component of the overall set, or fills in the gap with, a zero image. The high frequency subimages 108 are the full set of high frequency subimages from the first pass (LH level subimage 804, HL level subimage 806, and HH level subimage 808), the second pass (second LH level subimage 906, a second HL level subimage 908, and a second HH level subimage 910), and the third pass (third pass LH subimage 914, third pass HL subimage 916, and third pass HH subimage 918), and are input into the high frequency encoder 114. Together, the zero image created at operation 404 and the high frequency subimages 108 create a square high frequency subimage 406.

The high frequency encoder 114 proceeds to operation 408, wherein the square high frequency subimage 406 is quantized in operation 408 to produce quantized high frequency data. The quantization process in the preferred embodiment uses a rounding process to remove fractional coefficients from the square high frequency subimage 406 to create the quantized high frequency data. Continuing, the high frequency encoder 114 compresses the quantized high frequency data with a lossless encoding technique in operation 410. In one embodiment, the preferred encoding technique is a Lempel-Ziv-Walch (LZW) process. In other embodiments, other lossless encoding techniques, such as Huffman coding and run length encoding, may be used. The encoded high frequency data is then stored as the compressed high frequency image 116. Once the compressed high frequency image 116 is created, the high level encoder 114 has completed its operation 412.

Figure 5:
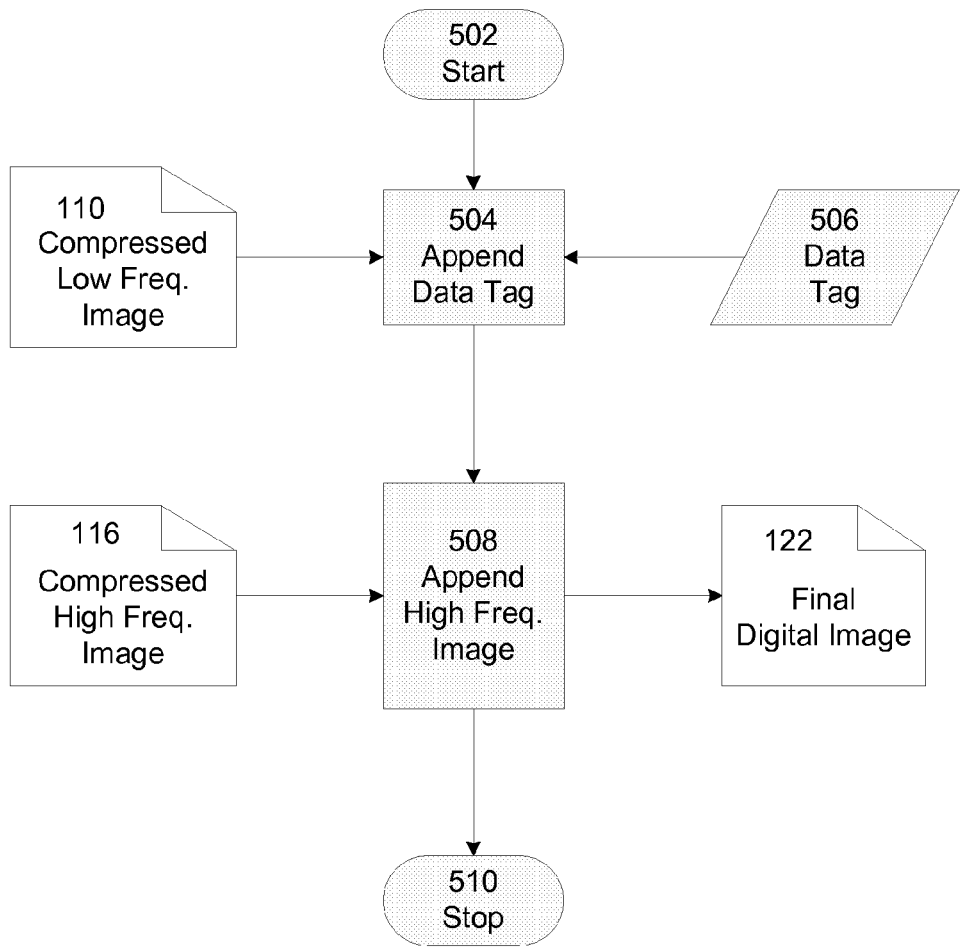
FIG. 5 is a flow chart detailing an operation of a file creator.

The file creator 118 of the imaging system 100 creates a final digital image 122 by combining both the compressed low frequency image 110 and the compressed high frequency image 116, which is compatible with standard rendering systems. In this embodiment, the JPEG file format is used. The operation of the file creator 118 is shown in FIG. 5.

The file creator 118 starts 502 its processing in operation 504 by appending a high frequency data tag 506 to the end of the compressed low frequency image 110. The data tag 506 is a delimiter for separating the compressed low frequency image 110 from the compressed high frequency image 116 in the final digital image 122. After appending the data tag 506, the file creator 118 proceeds to operation 508 and appends the compressed high frequency image 116 after the data tag 506, thereby creating the final digital image 122. The resulting final digital image 122 with compressed low frequency image 110 and compressed high frequency image 116 is compatible with most existing image rendering systems and may provide enhanced higher resolution details for a compliant image rendering system. Once the final digital image 122 is created, the file creator 118 has completed its operation 510.

In other embodiments, the file creator 118 embeds additional information in the final digital image 122. The additional information may be embedded anywhere in the final digital image 122 so long as it is easily delimited from the other data, such as at the end of the digital image 122.

Figure 6:
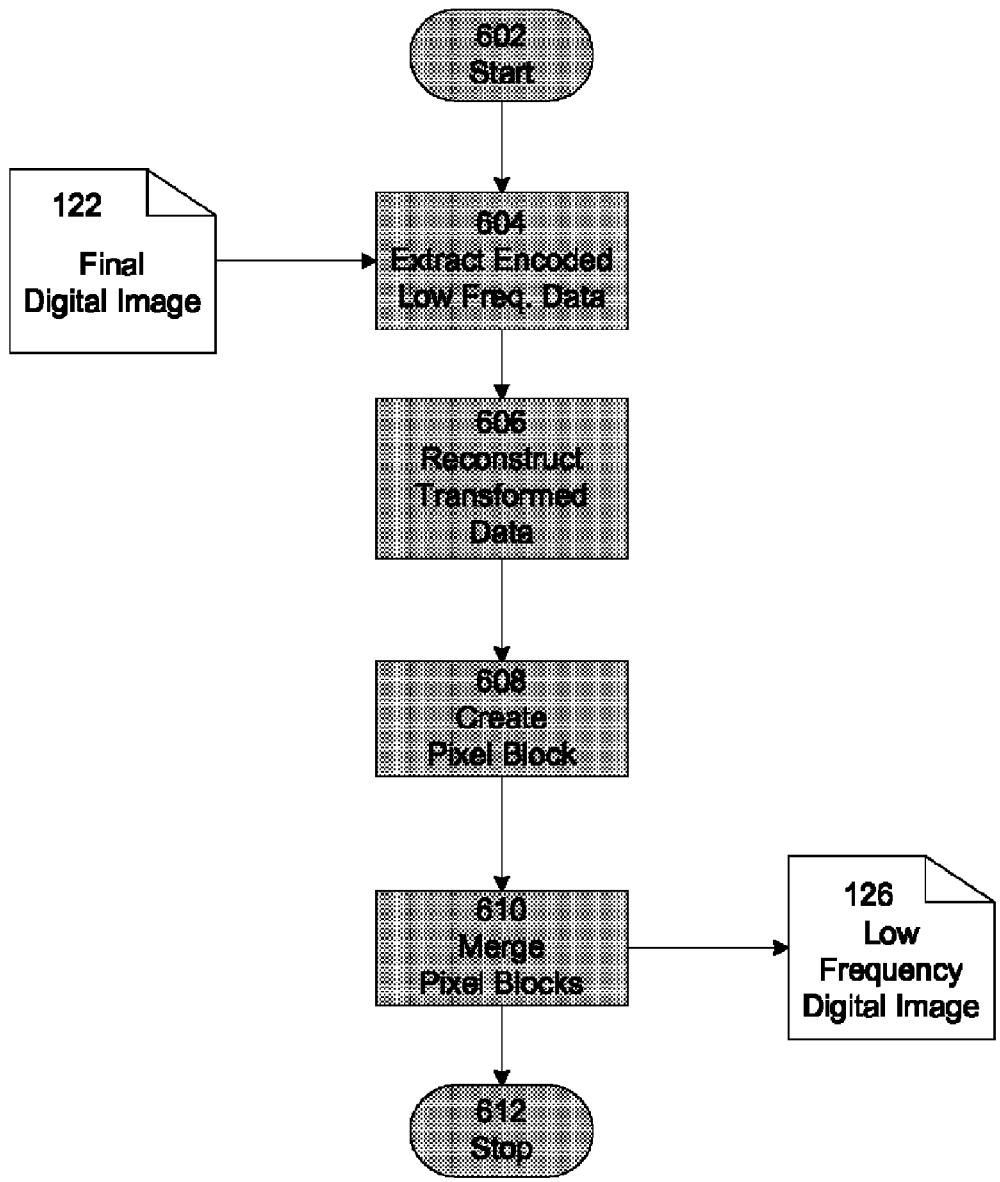
FIG. 6 is a flow chart detailing an operation of a non-compliant digital image decoder.

FIG. 6 illustrates the operation of a non-compliant digital image decoder 120 for creating a low resolution (low frequency) digital image 126 from the final digital image 122 containing the compressed low frequency image 110 embedded with compressed high frequency image 116. The non-compliant digital image decoder 120 starts 602 its processing with operation 604 by reading the final digital image 122 as it would any conventional compressed digital image file of a type used to encode a low frequency subimage. Thus, the non-compliant digital image decoder 120 extracts the compressed low frequency image 110 from the final digital image 122.

Proceeding to operation 606, non-compliant digital image decoder 120 uses a symbol decoder and reconstructs the DCT transformed data from the extracted compressed low frequency image 110. The DCT transformed data is then inverse transformed in operation 608 using an inverse DCT to output a series of n×n pixel blocks. The non-compliant digital image decoder 120 then performs operation 610 and merges the n×n pixel blocks into the low frequency digital image 126 using conventional rendering processes. When the non-compliant digital image decoder 120 reads the high frequency data tag 506, it stops processing because it does not have the means to render an image from the remaining data, i.e., the compressed high frequency image 116, in the final digital image 122. Thus, the non-compliant digital image decoder 120 terminates 612 after it finishes rendering the low frequency digital image 126.

Figure 7:
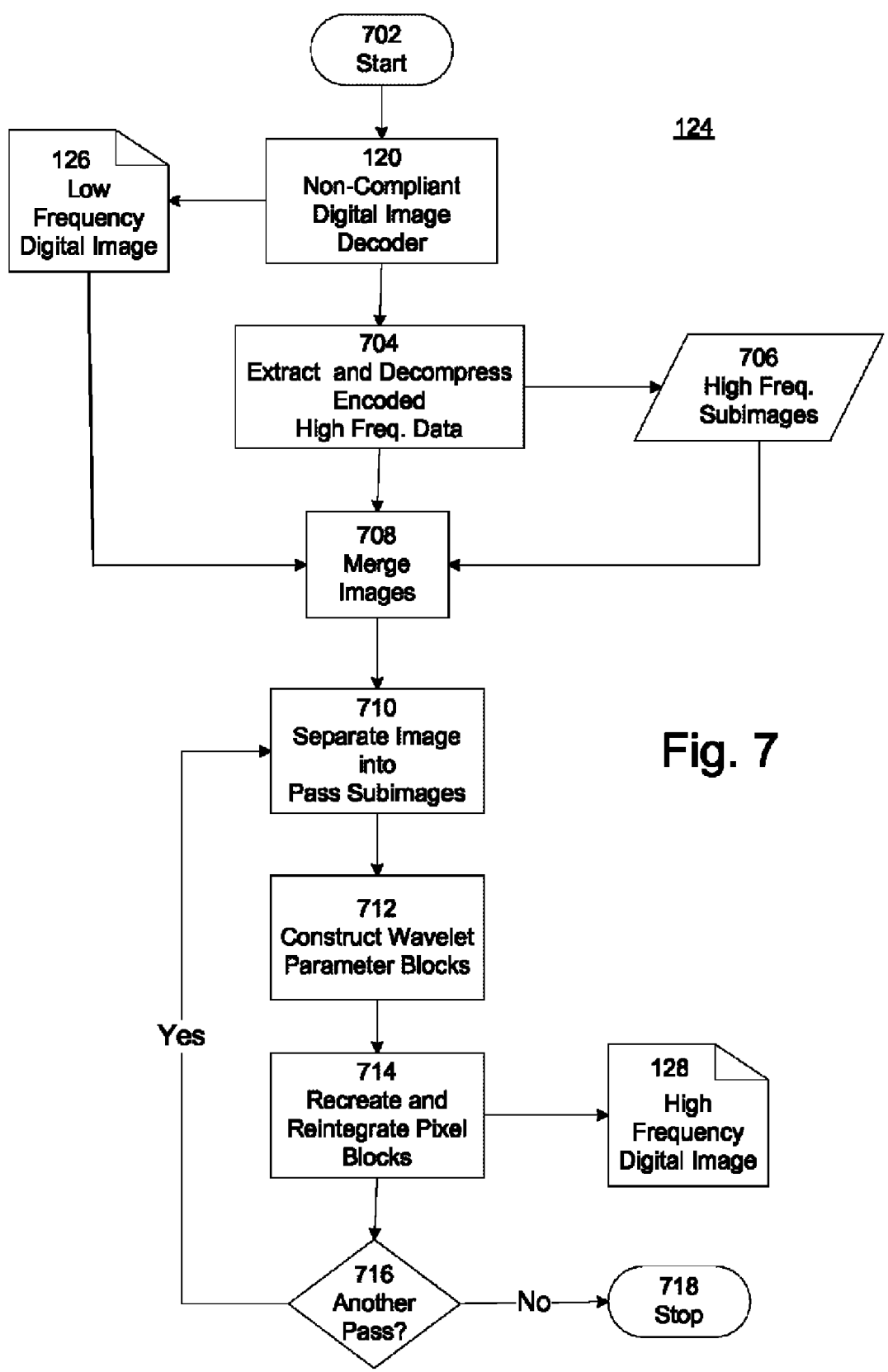
FIG. 7 is a flow chart detailing an operation of a compliant digital image decoder.

FIG. 7 illustrates the operation of a compliant digital image decoder 124 for creating a high frequency digital image 128 from the final digital image 122. The compliant digital image decoder 124 starts 702 its processing with invoking the non-compliant digital image decoder 120 to extract the compressed low frequency image 110 from the final digital image 122 and create the low frequency digital image 126.

Unlike the non-compliant digital image decoder 120, upon encountering the data tag 506, the compliant digital image decoder 124 continues processing of the compressed high frequency image 116 in the final digital image 122 to render a high frequency digital image 128. In particular, after creating the low frequency digital image 126, the compliant digital image decoder 122 proceeds to operation 704 to extract and decompress, or decode, the compressed high frequency image 116 using the inverse process to that used, such as an LZW decoder, to re-create the high frequency subimages 706.

The next operation 708 in the rendering process recreates the composite image 800 (or composite image 900) by merging the low frequency digital image 126 with the high frequency subimages 706. Continuing to operation 710, the compliant digital image decoder 124 separates the composite image 800 into the respective pass subimage blocks. In the described embodiment of three passes, the first reverse application extracts the third LL frequency subimage 912 and the third pass high frequency subimages: third pass LH subimage 914, third pass HL subimage 916 and third pass HH subimage 918. These subimages are input to the construct wavelet parameter blocks operation 712 which performs the inverse wavelet transform on the subimages 912, 914, 916, 918. The inverse wavelet transform operation 712, see Expression 5, is used to recreate the respective 2×2 pixel block, see Expression 1, that was used originally to create the wavelet parameters. Proceeding to operation 714, the resulting 2×2 pixel block is then reintegrated to create the second pass LL frequency subimage (not shown, but is at position 904 on FIG. 9). The compliant digital image decoder 122 determines in operation 716 if another pass of the LL frequency subimage is needed. The inverse wavelet transform is thus successively applied to the number of passes of the block image operation 204 performed by the image separator system 104 on the original input digital image 102. After the final pass 716, processing is complete 718, and a high frequency digital image 128 is available for display or printing.

$$\begin{bmatrix} x1 \\ x2 \\ x3 \\ x4 \end{bmatrix} = \begin{bmatrix} 1 & 1 & 1 & 1 \\ 1 & 1\square 1\square & 1 \\ 1\square 1 & 1\square 1 \\ 1\square 1\square 1 & 1 \end{bmatrix} \begin{bmatrix} a \\ b \\ c \\ d \end{bmatrix} \qquad \text{[Expression 5]}$$

A scanner is a common digital image generation device. A digital image generated by a scanner is encoded using the system and process outlined above to create a final digital image file 122 with a compressed low frequency image 110 and a compressed high frequency image 116. In the preferred embodiment, the software for creating the final digital image file 122 of the present invention with compressed high frequency image 116 resides in the scanner interface software. The user has the option to save a scanned image with embedded high frequency subimages 108 or to use a standard image file format. Then, a compliant digital image decoder 124, which is embedded in an authorized compliant image viewing and rendering system, enables viewing of the final digital image file 122 with the compressed high frequency image 116 to be viewed at high resolution. In an alternative embodiment, the compliant digital image decoder 124 is embedded within a printer driver or printer controller whereby the printer driver or printer controller utilizes the high frequency information embedded within the final digital image file 122 with compressed high frequency image 116 to create high resolution output.

The embodiments of the present invention shown in the drawings and described above are exemplary of numerous embodiments that may be made within the scope of the appended claims. It is contemplated that numerous other configurations, methods, processes and applications of the embedded high frequency image detail system may be created taking advantage of the disclosed approach. Therefore, it is the applicant's intention that the scope of the patent issuing herefrom will be limited only by the scope of the appended claims.

What is claimed is:

1. A system for creating and using a digital image file with embedded high frequency image details, comprising:
   a digital image adapted to be stored as a digital image file with embedded high frequency image details;
   a blocking system to convert said digital image into pixel blocks;
   a wavelet transform system to wavelet transform said pixel blocks into wavelet parameters;
   a low frequency encoder for extracting a low frequency subset representing low frequency image data from said wavelet parameters and for transforming and compressing said low frequency subset using an image compression encoding system to create a compressed low frequency image file;

a high frequency encoder for extracting a high frequency subset representing high frequency image data from said wavelet parameters and encoding said high frequency subset to create a compressed high frequency image data; and, a file creation system that inserts a high frequency image data tag and said compressed high frequency image data into said compressed low frequency image file.

2. The system of claim 1, wherein said blocking system converts said digital image into non-overlapping pixel blocks.

3. The system of claim 2, wherein said non-overlapping pixel blocks are 2×2.

4. The system of claim 1, wherein coefficients of said wavelet transform are: [1 1 1 1; 1 1-1-1; 1-1 1-1; 1-1-1 1].

5. The system of claim 1, wherein said wavelet transform is selected from the group consisting of: Haar, Daubechies, Cohen-Daubechies-Feauveau, and symlet.

6. The system of claim 1, wherein said image compression encoding system is selected from the group consisting of: JPEG, JPEG2000, TIFF, GIF, PNG, Exif, and bmp.

7. The system of claim 1, wherein said high frequency encoder uses an LZW encoding algorithm.

8. The system of claim 1, wherein said file creator inserts a wavelet coefficient data tag and coefficients of said wavelet transform into said compressed low frequency image file.

9. The system of claim 1, further comprising a non-compliant digital image decoder that bypasses said high frequency image data and only renders said compressed low frequency image file.

10. The system of claim 1, further comprising a compliant digital image decoder that comprises:

a low frequency rendering system to recreate said low frequency subset from said compressed low frequency image file;

a high frequency decoding system that reconstructs said high frequency subset from said high frequency image data;

an integration system that reintegrates said low frequency subset with said high frequency subset to recreate said wavelet transform parameters;

an inverse wavelet transform system to apply an inverse wavelet transform to said wavelet transform parameters to recreate said pixel blocks; and a pixel block integration system to reintegrate said pixel blocks into a high frequency digital image.

11. A method for embedding high frequency image details in a digital image file, comprising:

blocking a digital image to create digital image blocks;

transforming said digital image blocks with a wavelet transform to create a low frequency subimage and a high frequency subimage;

transforming and encoding said low frequency subimage with an established image encoding technique to create a compressed low frequency image file;

encoding said high frequency subimage to create compressed high frequency image data; and appending said high frequency image data to said compressed low frequency image file to create the digital image file with embedded high frequency details.

12. The method of claim 11, wherein said blocking the digital image creates non-overlapping digital image blocks that are 2×2 pixels.

13. The method of claim 11, wherein said transforming said digital image blocks produces four wavelet parameters for each digital image block.

14. The method of claim 11, wherein said method is repeatedly applied to said compressed low frequency image file.

15. The method of claim 11, wherein said appending said high frequency image data comprises appending a high frequency image tag to delineate said compressed high frequency image data.

16. The method of claim 11, further comprising rendering the embedded high frequency image details in a digital file, said rendering comprising:

separating the digital image file into said compressed low frequency image file and said high frequency image data;

rendering said compressed low frequency image file to create said low frequency subimage;

decoding said high frequency image data to create said high frequency subimage;

integrating said low frequency subimage with said high frequency subimage to recreate said digital image blocks;

applying an inverse wavelet transform to said digital image blocks to recreate said digital image blocks; and, reintegrating said digital image blocks to form said digital image.

17. A digital imaging device, comprising:

a means for capturing digital image data;

a means for blocking said digital image data into pixel blocks;

a wavelet transform system to wavelet transform said pixel blocks into wavelet parameters;

a low frequency encoder that extracts a low frequency subset representing a low frequency subimage from said wavelet parameters with a means for creating a compressed low frequency image file from said low frequency subset;

a high frequency encoder that extracts a high frequency subset representing high frequency subimages from said wavelet parameters with a means for creating a compressed high frequency image file; and, a means for integrating said compressed high frequency image file into said compressed low frequency image file.

18. The digital imaging device of claim 17, wherein said compressed low frequency image file is in an established digital image file format.

19. The digital imaging device of claim 17, wherein said high frequency encoder is a lossless encoder.

20. The digital imaging device of claim 17, wherein said means for integrating said compressed high frequency image file into said compressed low frequency image file uses a high frequency image tag to separate said high frequency subimages from said compressed low frequency subimages.

* * * * *